(No Model.) 2 Sheets—Sheet 1.
H. WILEN.
CLAMP FASTENING FOR BEDSTEADS.
No. 552,026. Patented Dec. 24, 1895.
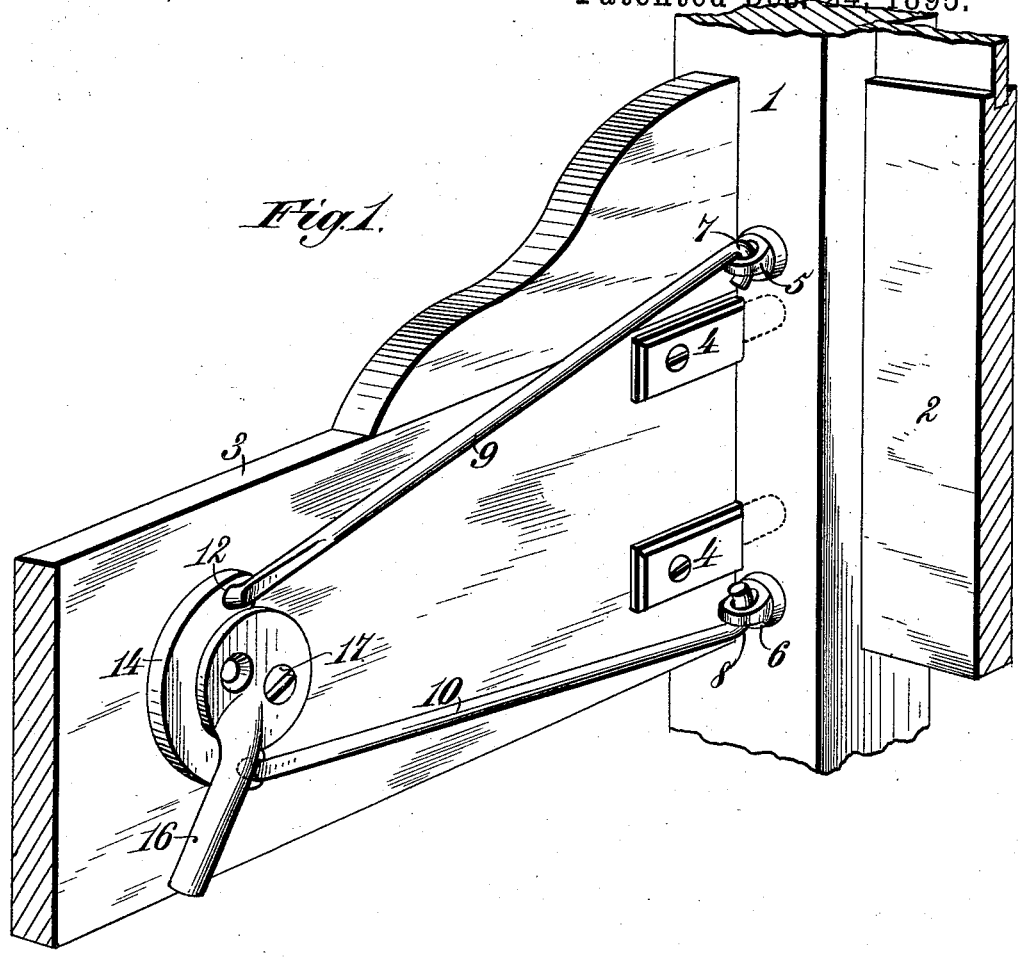
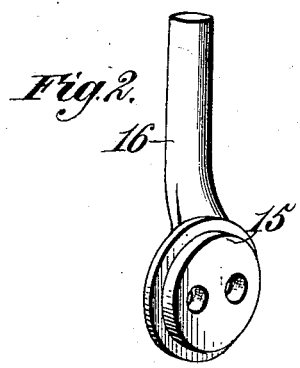
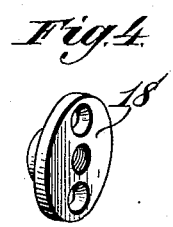
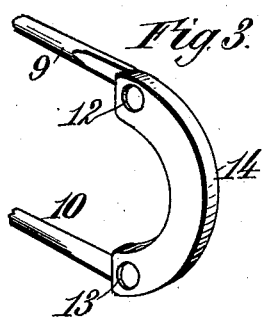
Witnesses.
Inventor:
Henry Wilen.
By James L. Norris
Atty.

(No Model.) 2 Sheets—Sheet 2.
H. WILEN.
CLAMP FASTENING FOR BEDSTEADS.
No. 552,026. Patented Dec. 24, 1895.
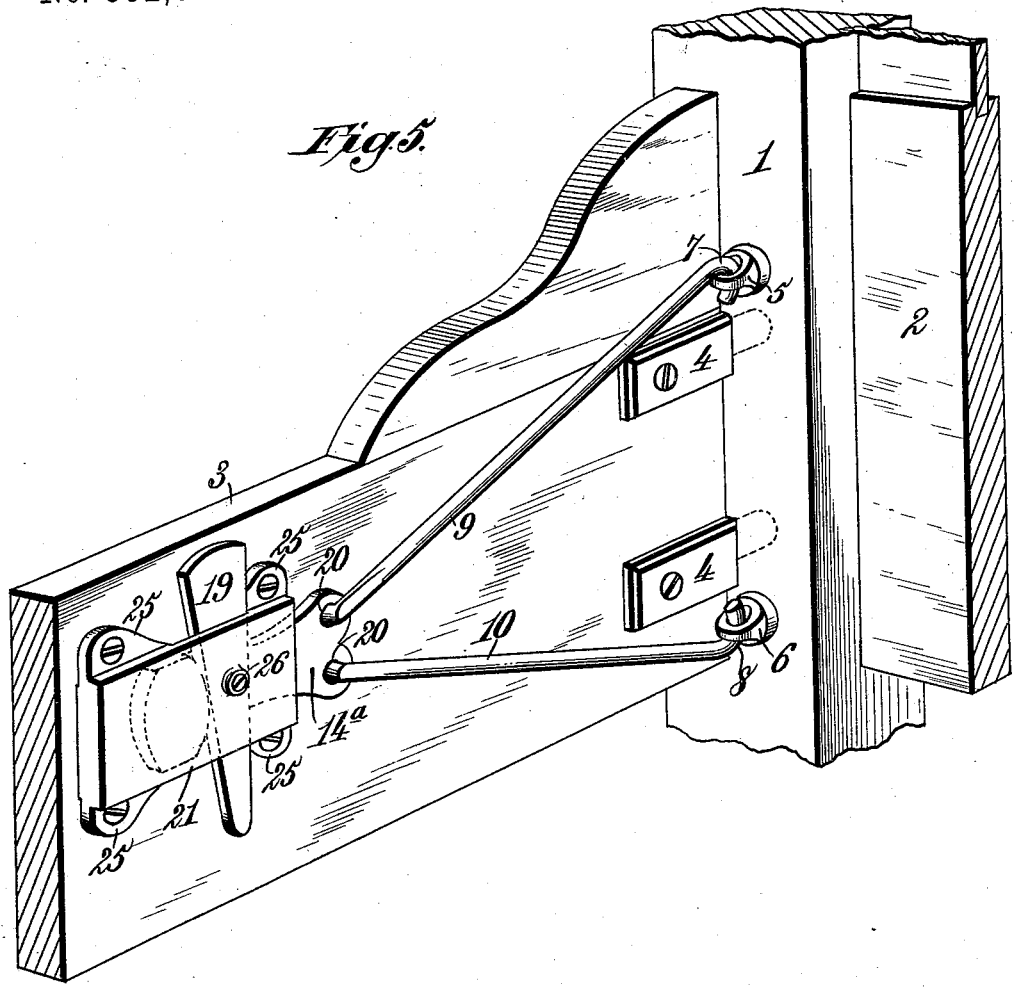
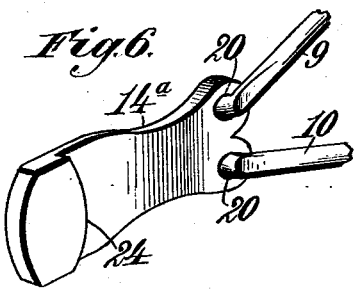
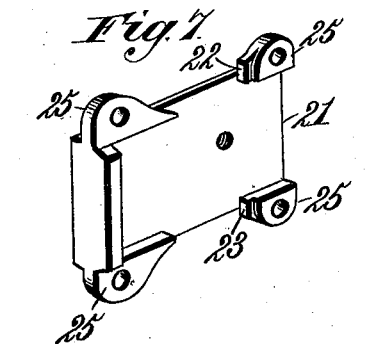
Witnesses.
Inventor.
Henry Wilen.
By James L. Norris.
Atty.

UNITED STATES PATENT OFFICE.

HENRY WILEN, OF MARTINSBURG, WEST VIRGINIA.

CLAMP-FASTENING FOR BEDSTEADS.

SPECIFICATION forming part of Letters Patent No. 552,026, dated December 24, 1895.

Application filed October 21, 1895. Serial No. 566,386. (No model.)

*To all whom it may concern:*

Be it known that I, HENRY WILEN, a citizen of the United States, residing at Martinsburg, in the county of Berkeley and State of West Virginia, have invented new and useful Improvements in Clamp-Fastenings for Bedsteads and other Furniture, of which the following is a specification.

This invention relates to fastening devices for connecting the separate parts of furniture, particularly the head and foot boards and the side rails of bedsteads.

The object of the present invention is to provide novel, simple, and efficient means whereby the separate parts of any article of furniture can be rigidly and immovably connected to secure tight joints and avoid rattling while the parts are susceptible of convenient and quick separation whenever desired.

The invention also has for its object to provide new and improved securing devices, which can be applied to ordinary bedsteads now in use, for rigidly connecting the parts by the mere addition of the securing devices and without the necessity of specially mortising the corner-posts to receive such securing devices, as is essential in that type of fastenings wherein plates having hooks at one end engaging sockets in the corner-posts are moved lengthwise by cam devices to clamp the head and foot boards to the side rails of a bedstead.

The invention also has for its object to provide new and improved fastening devices, which can be more readily operated to connect and disconnect the parts than prior devices composed of cam-actuated sliding plates having hooked ends entering mortised sockets in the corner-posts of a bedstead.

To accomplish all these objects my invention consists essentially in the combination of a movable or shiftable plate, a pair of arms pivoted at one end to opposite portions of the said plate, and provided at the other end with hooks constructed to engage and disengage hook-receiving eyes, and a plate-shifting device for moving or shifting the plate to simultaneously move both hooked arms lengthwise, for the purpose of rigidly clamping two separate parts together.

The invention also consists in certain other features of construction and combination or arrangement of parts hereinafter described and claimed, reference being made to the accompanying drawings, in which—

Figure 1 is a broken perspective view of a portion of a bedstead provided with my invention. Fig. 2 is a detail perspective view looking at the inner side of the cam-lever which acts upon the movable or shiftable plate. Fig. 3 is a detail perspective view of the movable or shiftable plate. Fig. 4 is a detail perspective view of the metal bearing-block for supporting the pivoted cam-lever. Fig. 5 is a broken perspective view similar to Fig. 1, showing a modification of my invention. Fig. 6 is a detail perspective view of the movable or shiftable hook-carrying plate of the modified construction, and Fig. 7 is a detail perspective view to more clearly illustrate the construction of the guide-frame or housing for the movable or shiftable plate of the modified construction.

In order to enable those skilled in the art to make and use my invention, I will now describe the same in detail, referring to the drawings, wherein I have illustrated my invention applied to a bedstead, for rigidly connecting the headboard with the side rails.

The invention is primarily designed for clamping the head and foot boards of a bedstead to the side rails, and for this reason I have illustrated a portion of a bedstead in the drawings. I wish it to be understood, however, that my invention can be employed for rigidly connecting together the separate parts of any article of furniture in such manner that the parts can be readily disconnected or separated when occasion demands.

The numeral 1 indicates a portion of the corner-post of a bedstead, 2 a portion of the headboard, and 3 a portion of one of the side rails. The side rails are preferably provided with metal blocks 4 having tenons entering mortises in the corner-post, as is usual in bedsteads. The corner-post is provided with two hook-receiving eyes 5 and 6, arranged one above the other and separated some distance apart—in practice about three inches apart, more or less. The eyes 5 and 6 are integral parts of metallic shanks secured in the corner-post, and the eyes are adapted to receive the hooks 7 and 8 on the ends of the two arms 9 and 10, which arms, at their ends opposite the hooks, are provided with pintles pivotally engaging eyes or orifices 12 and 13, formed in opposite portions of a movable or shiftable plate 14 in such manner that the hooked arms can be freely swung on the plate, for the purpose of facilitating the engagement of the hooks 7 and 8 with the hook-receiving eyes 5 and 6.

The movable or shiftable plate 14, in the preferred form of my invention, illustrated in Figs. 1 to 4, inclusive, is crescent or segmental shaped, and the hooked arms 9 and 10 are pivoted or swiveled to opposite ends of the crescent or segmental shaped plate. The curved inner edge of the plate is designed to be acted upon by the eccentric portion 15 of a lever 16, eccentrically pivoted through the medium of a screw or other suitable pivot 17 to a metallic bearing-block 18 set in a mortise, or otherwise applied to the inner surface of the side rail 3 of the bedstead. The eccentric of the lever lies between the two hooked arms 9 and 10, and when the lever is swung in one direction the eccentric acts upon the curved inner edge of the crescent or segmental plate 14 to move or shift the same, and thereby draw the hooked arms 9 and 10 lengthwise, for the purpose of rigidly clamping the corner-post to the end of the side rail of the bedstead.

By clamping the parts of the bedstead together in the manner described and shown a very tight joint is obtained which effectually excludes vermin and avoids rattling of the connected parts.

When the parts of the bedstead are to be disconnected, the lever is turned in the proper direction to release the movable or shiftable plate, when, owing to the pivotal connection of the plate with the hooked arms, the plate can be moved vertically over the lever and the hooked extremities of the arms disconnected from the hook-receiving eyes.

The movable or shiftable plate 14 is preferably moved through the medium of the cam-lever described and shown, for the purpose of drawing the hooked arms lengthwise, and thereby clamping the corner-post and side rail together; but, as illustrated in the modification, Figs. 5, 6, and 7, the movable or shiftable plate can be acted upon by a wedge, as at 19, for the purpose of acting on the movable or shiftable plate 14$^a$ to draw the hooked arms lengthwise, and thereby clamp the corner-post to the side rail.

In the modified construction the hooked arms 9 and 10 are provided at one end with the hooks 7 and 8 engaging the hook-receiving eyes 5 and 6. The other ends of the hooked arms are pivoted or swiveled in orifices 20, formed in opposite portions of the plate 14$^a$, and this plate is movable back and forth in a guide frame or housing 21, provided with shoulders 22 and 23.

The movable or shiftable plate 14$^a$ is constructed at one side with a lateral shoulder 24, so that when the wedge 19 is driven downward, between the inner surface of the guide frame or housing 21 and the plate 14$^a$, one edge of the wedge abuts the shoulders 22 and 23, while the opposite edge abuts the shoulder 24 of the plate 14$^a$, thereby moving the plate 14$^a$ in the guide frame or housing and drawing the hooked arms 9 and 10 lengthwise, for the purpose of rigidly clamping the corner-post to the side rail of the bedstead.

The guide frame or housing is provided with offset or projecting ears 25 having screw-holes for the passage of screws by which to secure the guide-frame or housing to the side rail of the bedstead.

The improved fastening device described and shown acts in the nature of a clamp for clamping together the parts which are to be united. It is simple in construction, it is readily applied, it is efficient in operation, and its character is such that it can be applied to bedsteads now in use for rigidly clamping the head and foot boards to the side rails.

In the practical use of my invention it is unnecessary to mortise the corner-posts and set in metallic pieces or sockets to engage the hooks, as is essential in prior fastenings, in which plates having hooks at one end engaging sockets are moved lengthwise by cam devices to clamp the head and foot boards to the rails of a bedstead.

The pivotal attachment of the hooked arms to the movable or shiftable plate is important, in that it permits the arms to be swung or manipulated for causing them to engage or disengage the hook-receiving eyes.

In the drawings the eccentric lever is represented as provided with two orifices, through either of which the pivot pin or screw can be passed; and the same remarks apply to the bearing-block which serves to support the eccentric lever. The purpose of this construction is to render the lever and the bearing-block susceptible of being applied to the right or left hand side rail of the bedstead, as will be obvious.

In the modification, where the wedge is employed to move or shift the plate 14$^a$, it may be desirable to lock the wedge after it has been driven inward to shift the plate and draw the hooked arms lengthwise. For this purpose the frame or housing 21 may be provided with a set-screw 26, adapted to be screwed in, so that the inner end of the screw will engage and hold the wedge in the position to which it has been driven.

Having thus described my invention, what I claim is—

1. The combination in a fastening for bedsteads and other furniture, of a movable or shiftable plate, a pair of hooks pivoted to said plate and constructed to engage and disengage hook-receiving eyes, and a plate-shifting device for moving or shifting the plate to simultaneously draw both hooks lengthwise, substantially as described.

2. The combination in a fastening for bedsteads and other furniture, of a movable or shiftable plate, a pair of arms pivoted at one end to opposite portions of the said plate and provided at the opposite end with hooks for engaging and disengaging hook-receiving eyes, and a plate-shifting device for simultaneously moving both hooked-arms lengthwise, substantially as described.

3. The combination in a fastening for bedsteads and other furniture, of a movable or shiftable plate provided at opposite portions with eyes or orifices, a pair of arms provided at one end with pintles engaging said eyes or orifices and having at the opposite end hooks for engaging the hook-receiving eyes, and a plate-shifting device for moving or shifting the plate to simultaneously move both hooked-arms lengthwise, substantially as described.

In testimony whereof I have hereunto set my hand in presence of two subscribing witnesses.

HENRY WILEN.

Witnesses:
L. W. ROBINSON,
G. W. CUSHWA.